(12) United States Patent
Patrascu et al.

(10) Patent No.: US 7,338,384 B2
(45) Date of Patent: Mar. 4, 2008

(54) PROPSHAFT BOOT WITH INTEGRATED BEARING SEAL DEFLECTOR

(75) Inventors: Dumitru F. Patrascu, West Bloomfield, MI (US); Robert J. Wehner, Livonia, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 189 days.

(21) Appl. No.: 11/249,245

(22) Filed: Oct. 13, 2005

(65) Prior Publication Data

US 2007/0087847 A1    Apr. 19, 2007

(51) Int. Cl.
*F16D 3/84* (2006.01)

(52) U.S. Cl. ...................... 464/175; 277/353

(58) Field of Classification Search ............... 277/346, 277/353, 549, 551, 635, 636; 464/173–175
See application file for complete search history.

(56) References Cited

U.S. PATENT DOCUMENTS

| | | | |
|---|---|---|---|
| 3,191,950 A * | 6/1965 | Hiltner | |
| 4,199,159 A * | 4/1980 | Evans | ......................... 277/636 |
| 4,270,442 A | 6/1981 | Bainard et al. | |
| 4,327,925 A | 5/1982 | Alexander et al. | |
| 5,833,542 A | 11/1998 | Harrold et al. | |
| 5,836,824 A | 11/1998 | Konegen et al. | |
| 6,083,109 A * | 7/2000 | Gerulski | ..................... 464/175 |
| 6,319,132 B1 * | 11/2001 | Krisher | .................. 464/175 X |
| 6,354,602 B1 | 3/2002 | Oldenburg | |
| 6,357,757 B1 | 3/2002 | Hibbler et al. | |
| 6,558,262 B1 | 5/2003 | Breidenbach et al. | |
| 6,814,668 B2 | 11/2004 | Grupido | |
| 6,837,795 B2 | 1/2005 | Menosky et al. | |
| 2003/0006563 A1 * | 1/2003 | Cater et al. | ................. 277/549 |
| 2004/0224779 A1 | 11/2004 | Menosky | |
| 2005/0085305 A1 | 4/2005 | Wehner | |

* cited by examiner

*Primary Examiner*—Greg Binda
(74) *Attorney, Agent, or Firm*—Harness, Dickey & Pierce P.L.C.

(57) ABSTRACT

A power transmission device includes a housing, first and second shafts and a generally tubular boot. The housing has an aperture that at least the first shaft passes through. The first and second shafts are coupled together through a splined connection causing the shafts to rotate with one another while allowing axial translation between the shafts. The boot includes a first end engaged with the first shaft and a second end engaged with the second shaft. The first end of the boot includes a flange having an insert located therein. A portion of the first end biasedly engages the first shaft thereby eliminating the need for a clamp previously required.

21 Claims, 3 Drawing Sheets

PROPSHAFT BOOT WITH INTEGRATED BEARING SEAL DEFLECTOR

FIELD OF THE INVENTION

The present invention relates to power transfer devices and, more specifically, to boots for sealing splined shafts in power transfer devices.

BACKGROUND OF THE INVENTION

Convoluted elastomeric boots have been used to seal axially displaceable shafts in power transmission systems for years. These systems generally include two shafts having a splined connection to one another such that the shafts rotate at the same speed. The splines allow relative axial translation between the shafts to account for suspension and/or component articulation. Flexible boots are commonly used to protect the connection between the shafts from contamination. One known boot includes a first end clamped to a first shaft and a second end clamped to a second shaft. The clamping force may be provided by a metal band encompassing each end of the boot. In addition, a bearing seal deflector shaped as a washer may be axially positioned between the rotating boot and a stationary housing of the power transmission device to reduce the likelihood of contamination reaching a seal positioned between one of the shafts and the housing.

Unfortunately, some prior boots are known to suffer from a radial ballooning (or expansion) as the rotational speed of the shafts increases. The ballooning effect sometimes causes the seal between the boot and one of the shafts to fail thereby allowing contaminants to possibly damage bearings rotatably supporting the shafts. Furthermore, the metal bands must be individually handled and installed with care to assure that the bands do not rupture the boot. Accordingly, a cost is associated with the use of metal bands. Additional costs are associated with the handling and assembly of the washers.

Accordingly there is a need in the art for a robust protective boot for a power transmission device that exhibits a reduced ballooning effect to maintain a proper seal. Furthermore, a boot having an integral bearing seal deflector that eliminates the need for a separate washer would be beneficial.

SUMMARY OF THE INVENTION

The present invention provides a power transmission device including a housing, first and second shafts and a generally tubular boot. The housing has an aperture that at least the first shaft passes through. The first and second shafts are coupled together through a splined connection causing the shafts to rotate with one another while allowing axial translation between the shafts. The boot includes a first end engaged with the first shaft and a second end engaged with the second shaft. The first end of the boot includes a flange having an insert located therein. A portion of the first end biasedly engages the first shaft, eliminating the need for a clamp previously required.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
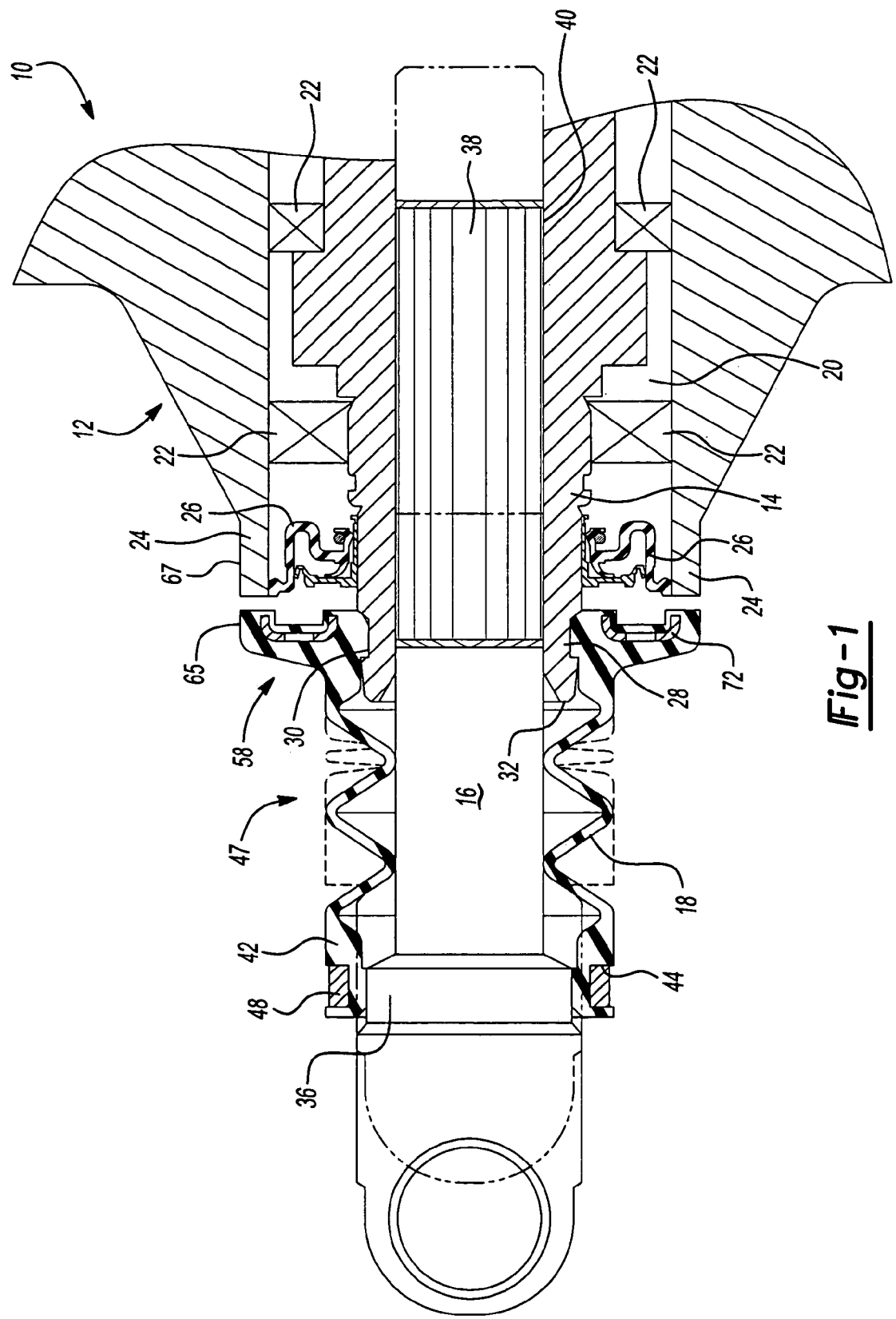
FIG. 1 is a cross-sectional view of a power transmission device illustrating a first shaft in a first position with solid lines and in a second position with phantom lines in accordance with the teachings of the present invention.
Figure 2:
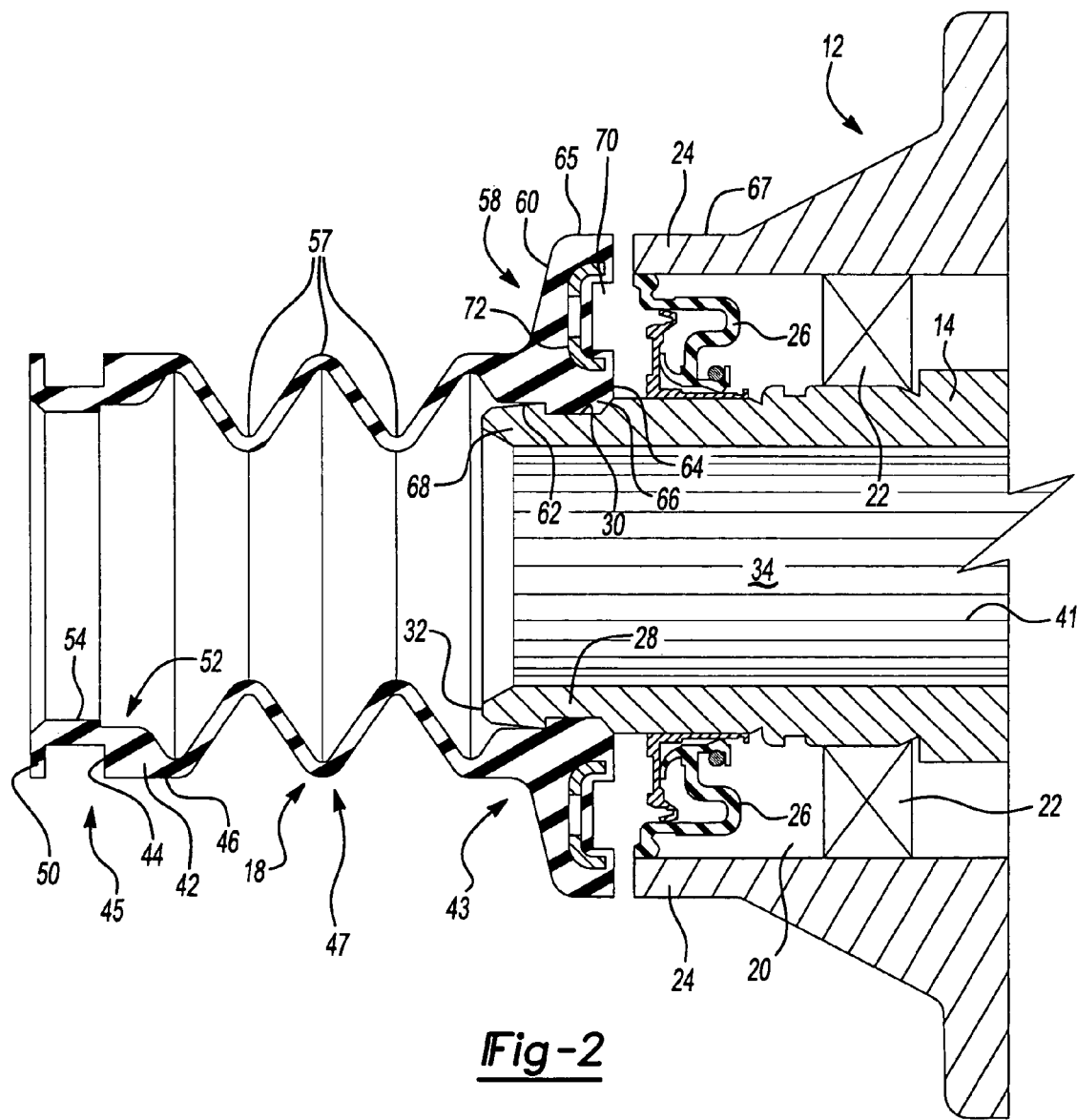
FIG. 2 is an enlarged portion of the cross-sectional view of FIG. 1.

With reference to FIGS. 1 and 2, an exemplary power transfer device 10 is shown in accordance with the teachings of the present invention. The power transfer device includes a transfer case 12, a first shaft 14, a second shaft 16 and a protective boot 18.

The transfer case 12 includes an aperture 20 having bearings 22 to rotatably support the first shaft 14 therein. An end portion 24 of the transfer case 12 includes a seal 26 disposed within the aperture 20 between the first shaft 14 and the transfer case 12. The seal 26 generally prevents ingress of contaminants into the aperture 20 and bearings 22.

The shafts 14, 16 are coupled to one another through a splined engagement, causing the shafts 14, 16 to rotate with one another while allowing the shafts 14, 16 to translate axially relative to one another. The first shaft 14 is housed within the transfer case 12 having an end portion 28 extending therefrom. The end portion 28 is generally cylindrical, having a recessed portion 30 circumferentially extending about the shaft 14 and axially disposed between an end 32 of the shaft 14 and the transfer case 12. The first shaft 14 includes an aperture 34 extending therethrough for receiving the second shaft 16. The second shaft 16 includes a first end portion 36 and a second end portion 38. The first end portion 36 is generally cylindrical. The second end portion 38 partially extends within the first shaft 14 and has an external spline 40 in driving connection with an internal spline 41 of first shaft 14. The protective boot 18 is fixedly engaged with the first and second shafts 14, 16 while allowing axial translation between the shafts 14, 16.

Figure 3:
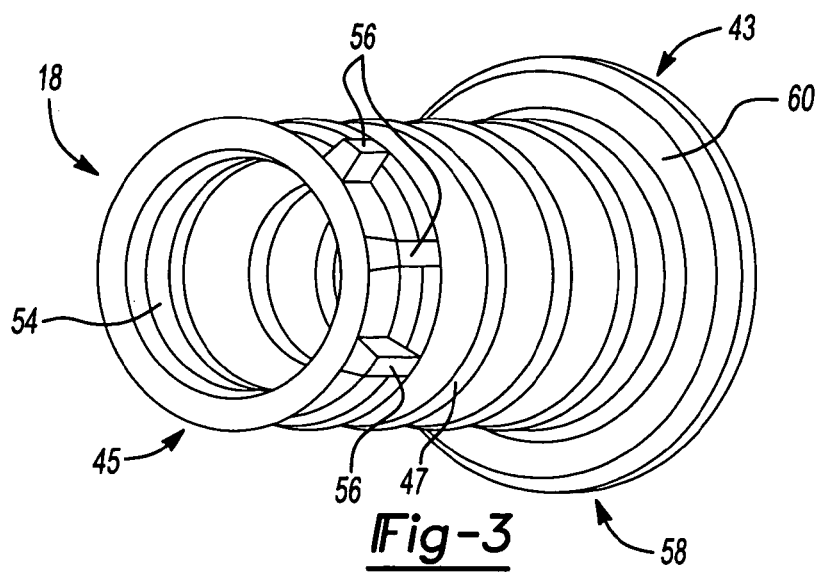
FIG. 3 is a perspective view of a boot.

Referring to FIGS. 1-3, the protective boot 18 is generally tubular and includes a first end 43, a second end 45 and a convoluted portion 47 disposed therebetween. The first end 43 is fixedly engaged with the first shaft 14. The second end 45 is fixedly engaged with the second shaft 16. The convoluted portion 47 allows the boot 18 to extend and contract axially as the first and second shafts 14, 16 translate axially relative to one another.

The second end 45 includes a generally tubular portion 42 having a recess 44 circumferentially disposed on an outer surface 46 for receiving a clamp 48. The tubular portion 42 also includes a generally flat end portion 50 and an inner surface 52. The inner surface 52 includes a circumferentially disposed protrusion 54 radially inwardly extending therefrom. A series of lugs 56 are disposed circumferentially around the second end 45 of the boot 18 between the recess 44 and the convoluted portion 47, providing radial reinforcement.

The convoluted portion 47 includes a plurality of convolutions 57. The convolutions 57 allow the boot 18 to extend and contract axially as the first and second shafts 14, 16 translate axially relative to one another. A boot 18 having three convolutions 57 is shown in the Figures. However, it should be noted that the number of convolutions 57 may vary depending on the application and the amount of axial translation required.

The first end 43 of boot 18 includes a flange 58. The flange 58 extends radially outwardly from the first end 43 of the boot 18. The flange 58 includes a ramped outer surface 60, an inner radial surface 62 and an end surface 64. The ramped outer surface 60 forms a generally conical section, extending increasingly radially outwardly as the ramped surface 60 approaches the end surface 64. The flange 58 radially outwardly extends beyond a radial extent of seal 26 to substantially cover the aperture 20 extending through transfer case 12. A substantially cylindrical outer surface 65 of boot 18 is aligned with an outer surface 67 of transfer case 12 to further limit possible ingress of contamination.

The inner radial surface 62 of flange 58 is generally cylindrical, having a protrusion 66 extending radially inwardly therefrom. The protrusion 66 is sized to engage the recessed portion 30 in the first shaft 14 in a snap-fit arrangement. The snap-fit provides greater ease of assembly by requiring the operator to merely urge the protrusion 66 on the boot 18 past a first portion 68 of the first shaft 14 until the protrusion 66 engages the recessed portion 30. The end surface 64 is a generally flat surface extending radially from the tubular body of the boot 18. The end surface 64 includes an annular recess 70. A plastic insert 72 is located in the first end 43 of the boot 18 proximate the end surface 64 and annular recess 70. Plastic insert 72 is shown completely encapsulated within boot 18. However, a portion of insert 72 may be exposed to the atmosphere without departing from the scope of the present invention. While the insert 72 is plastic in this example, it should be noted that the insert 72 could be constructed from a number of different materials commonly known in the art to provide rigid reinforcement.

Figure 4:
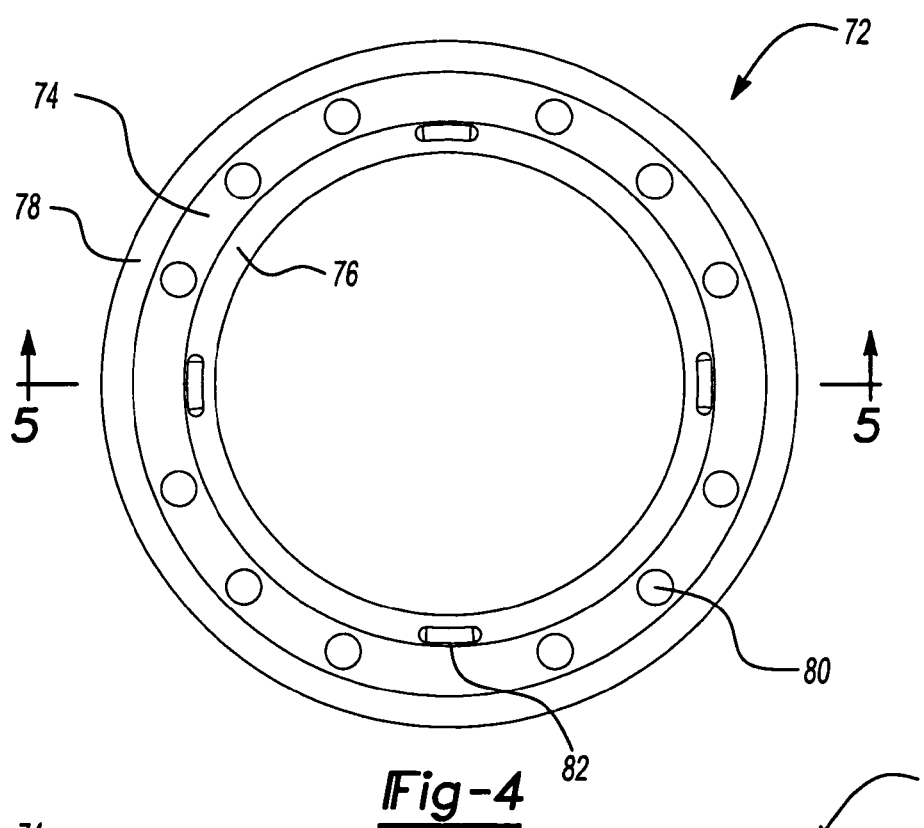
FIG. 4 is a top view of an insert.
Figure 5:
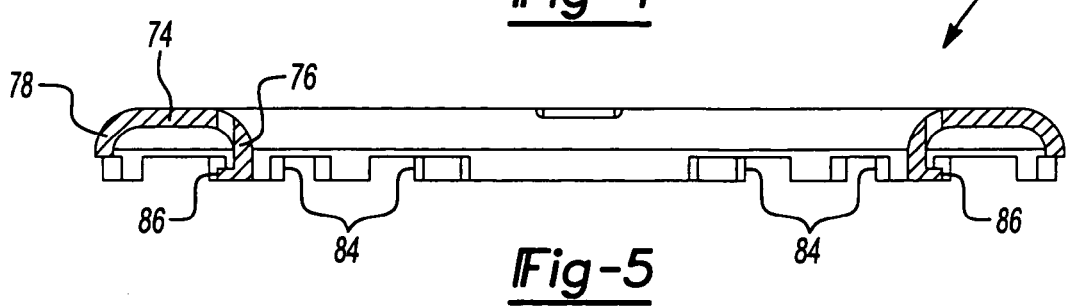
FIG. 5 is a cross-sectional view of the insert.

As seen in FIGS. 2, 4 and 5, the plastic insert 72 is generally annular and has a generally U-shaped cross section. The U-shaped cross section has a base 74, a first leg 76 and a second leg 78. The base 74 includes a plurality of apertures 80 extending generally axially therethrough. A series of slots 82 also extend through the base 74 and are located radially inward of the apertures 80. The legs 76, 78 of the U-shape form inner and outer circumferential limits, respectively. The first leg 76 forms an inner circumferential limit and the second leg 78 forms an outer circumferential limit. A radial distance between first leg 76 and second leg 78 defines a radial extent of plastic insert 72. The overall distance that plastic insert 72 axially extends may be defined as an axial extent of plastic insert 72. The radial extent of plastic insert 72 is greater than the axial extent. The legs 76, 78 include recessed portions 84 circumferentially spaced apart from one another. The first leg 76 also includes a protrusion 86 at a top portion thereof extending radially outwardly therefrom.

The plastic insert 72 is generally positioned within the first end 43 of the boot 18 where a portion of the boot 18 is located radially inward of the insert 72 and a portion of the boot 18 is located radially outward of the insert 72. The insert 72 is generally axially aligned with the radially inward protrusion 66 on the inner surface 62 of the first end 43 of the boot 18. As a result of the relative positioning, the stiffness of the portion of the boot 18 located between the insert 72 and the first shaft 14 is substantially increased. An increased stiffness assures a robust engagement is maintained between protrusion 66 and first shaft 14. Furthermore, the insert 72 provides structural rigidity to boot 18 whereby the boot 18 is less likely to radially expand or balloon during rotation.

The boot 18 may be formed by an injection molding process. During the process, the insert 72 is placed within a cavity of the mold. Subsequently, molten elastomeric material is injected into the mold. The insert 72 is encapsulated within the elastomeric material. During the injection process, molten elastomeric material passes through the apertures 80 and slots 82 in the insert 72 and surrounds the leg portions 76, 78. This simple process eliminates the need for additional parts such as band clamps for attachment of the first end 43 of the boot 18 to first shaft 14. Having the insert 72 integrally formed and retained within the first end 43 of the boot 18 greatly simplifies assembly as well. The assembly time is reduced and the chances of an improper installation that would typically result in a failure of the part are decreased.

The description of the invention is merely exemplary in nature thus, variations that do not depart from the gist of the invention are intended e within the scope of the invention. Such variations are not to be regarded as a departure from the spirit and scope of the invention.

What is claimed is:

1. A power transmission device comprising:
a housing having an aperture;
a first shaft drivingly coupled to a second shaft, said first and second shafts being axially movable relative to one another, each shaft at least partially extending through said aperture;
a generally tubular boot having a first end portion, a second end portion and at least one convolution positioned therebetween, said first end portion being engaged with said first shaft and said second end portion being engaged with said second shaft said first end portion including a generally radially extending flange having a generally circular insert at least partially encapsulated therein, said first end portion including a radially inwardly extending protrusion being biasedly engaged within an annular groove formed on said first shaft to retain said boot for rotation with said first shaft, said insert being located radially outward of said protrusion and at least a portion of said insert being axially aligned with said protrusion.

2. The power transmission device of claim 1, wherein said boot is injection molded from an elastomeric material.

3. The power transmission device of claim 2, wherein said insert includes a plurality of apertures extending therethrough, said elastomeric material extending through said insert apertures.

4. The power transmission device of claim 1, wherein said insert is completely encapsulated within said flange.

5. The power transmission device of claim 1, further comprising a seal radially disposed between and in engagement with said first shaft and said housing, said radially extending flange of said boot extending radially outwardly beyond said seal.

6. The power transmission device of claim 1, wherein said insert includes plastic.

7. The power transmission device of claim 1, wherein said insert includes circumferentially extending inner and outer legs interconnected by a substantially planar base, said planar base extending substantially perpendicular to an axis of rotation of said first shaft.

8. The power transmission device of claim 1, wherein said insert has a radial extent greater than an axial extent.

9. A power transmission device comprising:
a housing;
a first shaft rotatably supported by said housing;
a second shaft drivingly coupled with said first shaft, said second shaft being axially movable relative to said first shaft; and
an elastomeric boot having a first end coupled to said first shaft and a second end coupled to said second shaft for rotation therewith, said boot being operable to axially expand and contract in concert with said first and second shafts, said first end of said boot having a radially extending flange with a substantially rigid insert positioned therein, said boot including a compressible portion biasedly engaging said first shaft to retain said first end of said boot on said first shaft, said insert having an inner circumferential limit positioned adjacent said compressible portion and an outer circumferential limit proximate an unsupported edge of said flange.

10. The power transmission device of claim 9, wherein said boot is injection molded from an elastomeric material.

11. The power transmission device of claim 10, wherein said insert includes a plurality of apertures extending therethrough, said elastomeric material extending through said insert apertures.

12. The power transmission device of claim 9, wherein said insert is completely encapsulated within said flange.

13. The power transmission device of claim 9, further comprising a seal radially disposed between said first shaft and said housing, said seal contacting at least a portion of said first shaft and said housing, said first end of said boot extending radially beyond said seal.

14. The power transmission device of claim 9, wherein said flange includes a radially inwardly extending protrusion positioned within an annular groove formed on said first shaft.

15. The power transmission device of claim 14, wherein said insert is located radially outward of said compressible portion and at least a portion of said insert is axially aligned with said protrusion.

16. The power transmission device of claim 9, wherein said inner circumferential limit and said outer circumferential limit define a radial extent greater than an axial extent of said insert.

17. A power transmission device comprising:
a housing having an aperture with an end face surrounding said aperture;
a first shaft rotatably supported by said housing and including a portion axially extending beyond said end face;
a second shaft drivingly coupled with said first shaft, said second shaft being axially movable relative to said first shaft; and
an elastomeric boot having a first end fixed to said first shaft and a second end fixed to said second shaft for rotation therewith, said first end of said boot having a radially extending flange with a rigid insert positioned therein, said boot including a compressible portion in snap-fit engagement with said first shaft to retain said first end of said boot on said first shaft, said insert having at least a portion radially aligned with said end face.

18. The power transmission device of claim 17, wherein said flange radially extends substantially adjacent to said end face to limit the ingress of contamination into said aperture.

19. The power transmission device of claim 18, further comprising a seal radially disposed between said first shaft and said housing, said flange being positioned adjacent to said seal.

20. The power transmission device of claim 19 wherein said compressible portion is radially positioned between said first shaft and said rigid insert.

21. The power transmission device of claim 17 wherein said radially extending flange is spaced apart from said housing to allow relative rotation therebetween.

\* \* \* \* \*